United States Patent

[11] 3,621,211

| [72] | Inventor | Earl Stuart Perkins |
| | | Oak Brook, Ill. |
| [21] | Appl. No. | 816,302 |
| [22] | Filed | Apr. 15, 1969 |
| [45] | Patented | Nov. 16, 1971 |
| [73] | Assignee | Butler National Corporation |
| | | Oak Brook, Ill. |

[54] AUTOMATIC TRACK
10 Claims, 2 Drawing Figs.

[52] U.S. Cl. .................................................. 235/150.27, 343/106
[51] Int. Cl. ............................................... G06f 15/50
[50] Field of Search .......................................... 235/150.27; 343/112.1, 106

[56] References Cited
UNITED STATES PATENTS
| 2,599,889 | 6/1952 | Biggs et al. | 343/106 |
| 2,717,735 | 9/1955 | Luck | 235/150.27 |

Primary Examiner—Richard A. Farley
Assistant Examiner—Richard E. Berger
Attorney—Hill, Sherman, Meroni, Gross & Simpson

ABSTRACT: An aircraft navigation system which includes an area navigation apparatus capable of being set to selected way points with known bearings and distances from ground stations which includes an automatic track mode wherein an arbitrary way point along a selected track may be automatically chosen.

INVENTOR
Earl Stuart Perkins disconnects the way point potentiometer 13 from the way point bearing resolver 18 and connects the lead 55 as an input to the servoamplifier 56. Switch S3 supplies the x output of the OBI resolver on lead 26 as an input to the way point bearing resolver 18 on lead 23 and switch S4 connects the y output of the OBI resolver 12 to lead 24 to supply the y input to the way point bearing resolver 18. Switches S6 and S7 disconnect the summing amplifiers and the track resolver 33. The operation then is in "automatic waypoint mode" and the indicators 17 and 22 continuously give the aircraft's distance and bearing from the station such that the present position of the aircraft is the way point. Since the inputs to the track resolver 33 are disconnected by switches S6 and S7, the indicators 46 and 47 will be centered to indicate that the aircraft 41 is at the way point which is continuously moving with the aircraft. The utilization of the automatic way point mode is described in greater detail in my copending application entitled "Automatic Waypoint."

In "automatic track mode" the automatic way point knob 61 is turned to off so that the indicator 63 places the switches S1 through S7 to positions shown in FIG. 1. The track setting knob 34 is set to the desired track to be maintained. For example, with reference to FIG. 2, if an aircraft is to be flown from O'Hare Airport (ORD) in Chicago to the La Guardia Airport (LGA) in New York the track may be selected from a suitable map, with proper consideration of the declination. The track, for example, in FIG. 2 might be 40°. This track may be set by knob 34 in the track resolver and will be indicated on the indicator 37. For the first leg of the flight between ORD and LGA the DME and VOR ground stations at LAN (Lansing) may be tuned in and for automatic track mode the knob 14 may be turned to set in a distance of 150 miles. The switch S8 may be depressed to connect the x output on lead 70 to the servomotor 57 which will drive the shaft 21 through its output shaft 58 to adjust the way point bearing resolver 18 until the x output from track resolver 33 is zero. At this time the coordinates of a way point 150 miles from Lansing and on the selected track between ORD and LGA will be set into the system. For example, the way point bearing resolver 22 might read 135°.

The switch S8 is only momentarily closed to allow the servomotor 56 to drive the way point bearing resolver until the x output of the track resolver is zero and then it is released and the area navigation system operates in a normal mode with the automatic way point system off and the automatic track off.

The distance to way point is indicated by the needle 47 and when the needle 47 passes through the aircraft 41 the pilot knows that he is passing the radial indicated in the indicator 22 from the selected station (Lansing). As the aircraft travels along the track out of the range of the Lansing VOR and DME stations, the pilot can tune in another station such as CTW and can momentarily close switch S8 which will cause the servomotor 57 to drive the indicator 22 and the way point bearing resolver 18 to establish another way point on the track at the distance from the station CTW determined by the setting of the way point distance pot and indicated in the distance indicator 17.

This procedure may be accomplished by using a number of stations along the route and depends primarily on the distance being covered and the altitude of the aircraft since the range of the stations varies as a function of the altitude.

The advantage of the system is that way points on the selected track may be made and the pilot stays on the track and has navigation references at all times. The needle 46 will remain centered and the needle 47 will always indicate the distance to the point on the track corresponding to the settings of the indicators 17 and 22.

It is also to be realized that the automatic way point bearing mode can be used if the pilot wishes to obtain a fix as described in copending application entitled "Automatic Waypoint," and minor corrections may be made as required.

Although minor modifications might be suggested by those versed in the art, it should be understood that I which to embody within the scope of the patent warranted hereon all such modifications as reasonably and properly come within the scope of my contribution to the art.

I claim as my invention:

1. A navigation system for a craft having an area navigation computer including track selecting means for receiving radiant energy from a ground station and computing the distance and bearing of the craft to a selected way point comprising, means for selecting the distance and bearing coordinates of a selected way point relative to said ground station, and driving means selectively connected to one of said means for selecting coordinates and receiving an output of the area navigation computer so that the selected way point lies on the selected track.

2. A navigation system for a craft having an area navigation computer including track selecting means and receiving radiant energy signals indicative of position information from a ground station to compute the distance and bearing of said craft to a selected way point comprising, way point distance and bearing selecting means from said station, a driving means connectable to the way point bearing selecting means and receiving an input from said area navigation computer to select a way point on the selected track, and means for selectively connecting said driving means between the area navigation computer and the way point bearing selecting means.

3. The method of flying a selected track with an aircraft with an area navigation system comprising generating signals representative of a desired track of said aircraft and setting it into the area navigation system, generating signals representative of a distance to a way point from a ground navigation station and setting it into the area navigation system, and generating signals representative of a bearing to way point from said station as a function of the output of the area navigation system and such that the desired track passes through said way point.

4. A navigation system for receiving signals from a ground station and for a craft having an area navigation system with a track selector for said craft, a distance from said ground station to way point selector and a bearing from said ground station to way point selector, a track computing means connected to the outputs of said track selector, the distance to way point selector and the bearing to way point selector, and a driving means connected to the distance to way point selector and connectable to an output of the track computing means.

5. A navigation system according to claim 1 wherein said driving means is connected to the means for selecting coordinates to determine the bearing coordinate of a selected way point.

6. A navigation system for a craft according to claim 2 wherein the selecting means comprises a switch in the input of said driving means.

7. A navigation system according to claim 4 comprising a switching means connected between the driving means and the track computing means.

8. A navigation system according to claim 7 wherein said track computing means produces a pair of outputs indicative of the transverse and longitudinal coordinates of a way point and the output indicative of the transverse coordinate of the way point is connected to the driving means.

9. A navigation system according to claim 8 wherein the switching means is closed to connect the output indicative of the transverse component of the way point to said driving means until the output of the transverse component goes to zero.

10. A navigation system according to claim 9 including a cross-point indicator to which the outputs indicative of the transverse and longitudinal coordinates of the way point are displayed.

* * * * *

AUTOMATIC TRACK

CROSS REFERENCES TO RELATED APPLICATIONS

This invention is an improvement on U.S. Pat. No. 3,414,901 entitled "Aircraft Navigation System" and is related to copending application of Eart Stuart Perkins entitled "Automatic Waypoint" filed May 13, 1969 under Ser. No. 824,164.

BACKGROUND OF THE INVENTION

1. Field of the Invention

This invention relates in general to aircraft navigation systems and in particular to an improved area navigation system capable of being operated in an automatic track mode wherein a way point on a selected track may be automatically selected.

2. Description of the Prior Art

As airways and terminal areas about airports have become more and more crowded due to the increased air traffic, it has become apparent that improved methods and systems for controlling and directing aircraft must be developed. In the United States a specific number of navigation stations have been established and airways have been set up which pass directly over such navigation stations. Thus, as aircraft converge on a particular radial to a station the air space in the vicinity of the station becomes crowded. At the same time areas which are away from the station may be relatively uncrowded. Since the airways have been established on direct radials to and from the navigation stations it is oftentimes necessary to fly multiple tracks between two locations, thus requiring that a substantially greater distance be traveled than if a direct great circle route were flown.

SUMMARY OF THE INVENTION

The present invention provides an area navigation system which utilizes the facilities of the present navigation stations but which includes an area navigation system to allow flights which do not follow radials of the present stations, but alternatively, allows flights along any track to be made. Provision is made for selecting a desired track between two points and setting this track into the apparatus and setting a distance from a ground station into the area navigation system. By closing a switch a servo will position a way point bearing selector to a way point on the track selected. After the bearing from station has been set, the area navigation will fly on track toward the way point thus selected. The present position of the aircraft may also be obtained by utilizing the features of the automatic way point described in my copending application entitled Automatic Waypoint"AutomaticWaypoint" Ser. No. 824,164 filed May 13, 1969. As the aircraft progresses along the track different navigation stations may be tuned in to establish other way points.

Other and further objects of this invention will be apparent to those skilled in this art from the following detailed description of the annexed sheets of drawings which, by way of a preferred embodiment of the invention, illustrate one example of the invention.

DESCRIPTION OF THE PREFERRED EMBODIMENT

Figure 1:
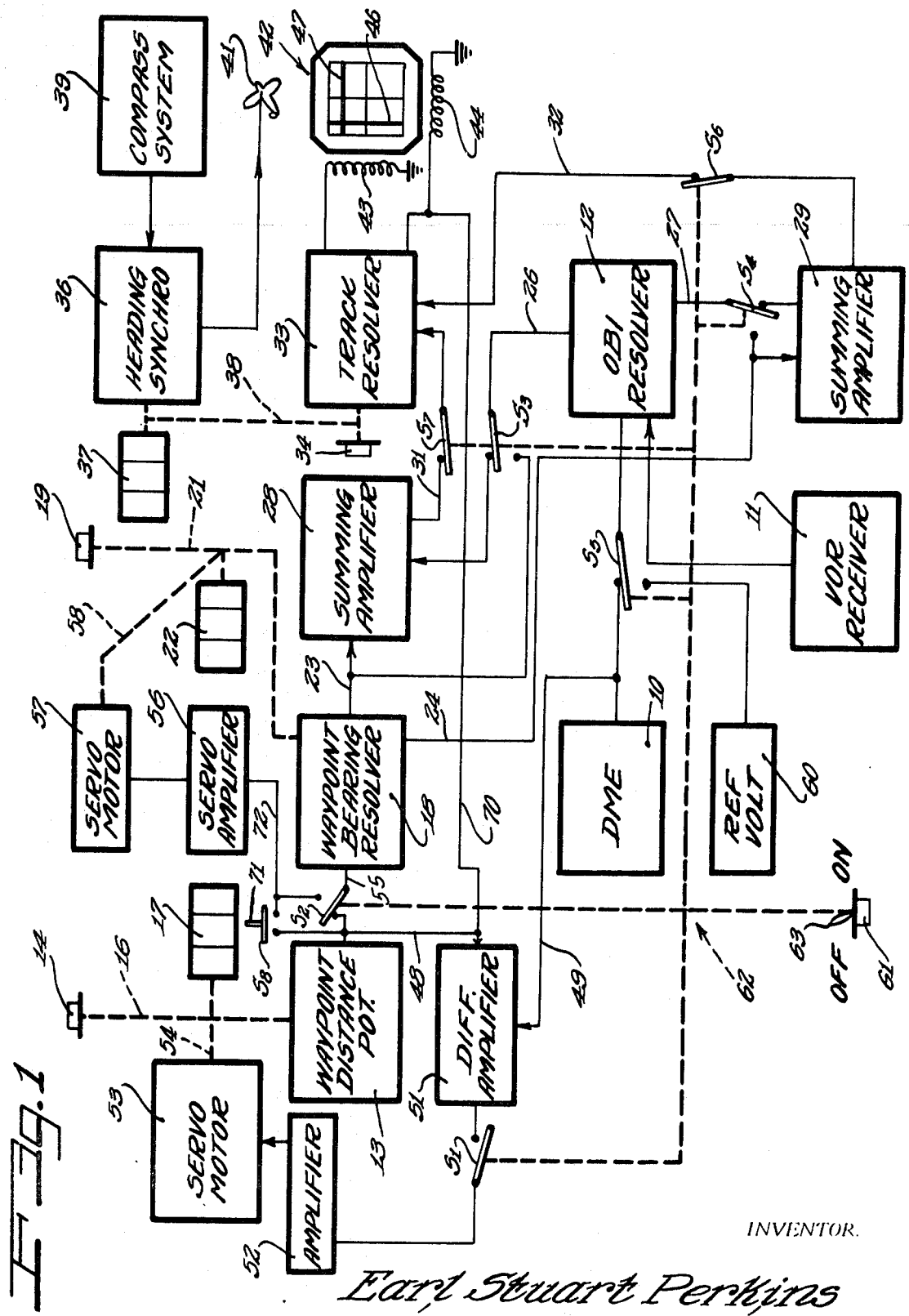
FIG. 1 is a block diagram illustrating the automatic track features of the invention.
Figure 2:
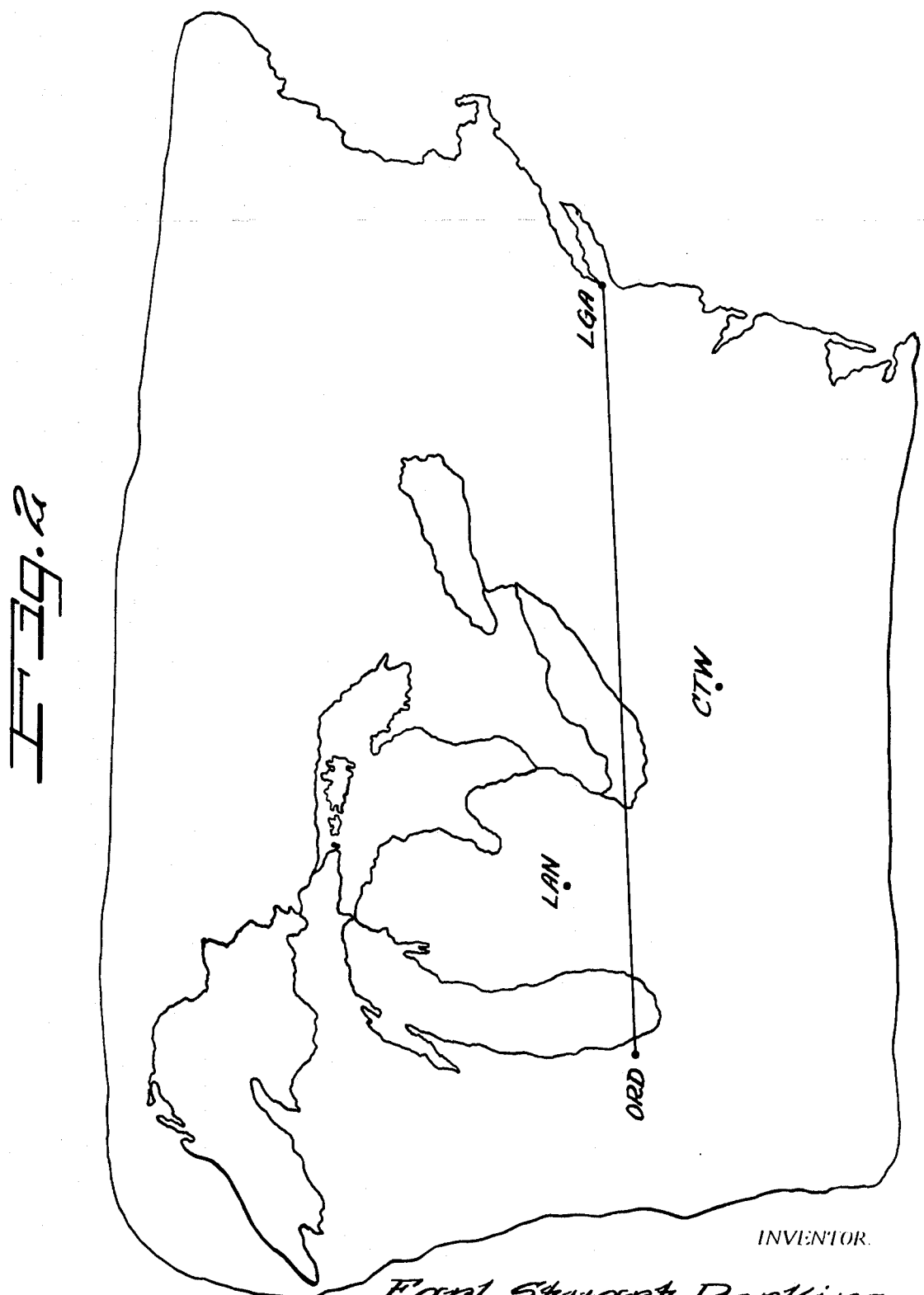
FIG. 2 is a map illustrating an example of the use of the automatic track feature on a flight between two points such as Chicago and New York.

FIG. 1 illustrates the area navigation system according to this invention which also includes the automatic way point features described in my copending application entitled "Automatic Waypoint" Ser. No. 824,164 filed May 13, 1969. The system includes a distance measuring receiver 10 which supplies an output through switch S5 to an omni bearing resolver 12 which also receives an input from the VOR receiver 11. The OBI indicator produces $x$ and $y$ coordinates of the aircraft relative to the DME and VOR transmitting stations and supplies these inputs to summing amplifiers 28 and 29 respectively, through leads 26 and 27.

A way point distance potentiometer has an input shaft 16 with a knob 14 for setting in distance of a selected way point from the ground station. An indicator 17 is fed by shaft 16 to indicate the distance of the way point from the station. The output of the way point distance potentiometer 13 is fed through switch S2 to lead 55 and to way point bearing resolver 18. The way point bearing resolver 18 has an input shaft 21 to which knob 19 is connected and an indicator 22 indicates the bearing of a selected way point from the DME and VOR stations. The output of the resolver 18 comprises $x$ and $y$ coordinates of the way point relative to the station and are supplied respectively to the summing amplifier 28 on lead 23 and to summing amplifier 29 on lead 24. The summing amplifiers 28 and 29 combine the $x$ and $y$ signals from the resolver 12 and the resolver 18 and supply the combined $x$ and $y$ signals through switches S7 and S6 respectively to leads 31 and 32 to track resolver 33.

Track resolver 33 is set to a selected track by knob 34 which is connected to shaft 38 and indicator 37 indicates the selected track. The output of the track resolver is supplied to meter movements 43 and 44, respectively, of area navigation indicator 42. The meter movement 43 receives the $y$ output of the track resolver 33 which controls the needle 47 of the indicator 42 and the meter movement 44 receives the $x$ output of the track resolver and controls the position of the vertical pointer 46 of the indicator 42. An aircraft indicia 41 is mounted at the center of indicator 42 and is controlled by the heading synchro 36 which also receives an input from compass system 39. The Heading Synchro 36 is also connected to shaft 38 of the Track Resolver 33. For simplicity the aircraft 41 is shown above the indicator 42 rather than mounted at the center of the indicator 42.

A lead 70 is connected to the $x$ output of the track resolver 33 and is connected to a contact of a switch S8 which has a push button 71 for connecting lead 70 to lead 72, which is the input of servoamplifier 56. Servoamplifier 56 supplies an input to the servomotor 57 which has an output shaft 58 connected to the shaft 21 to drive the way point bearing resolver 18 and the indicator 22.

An automatic way point knob 61 has an indicator 63 that may be moved from off to on by the knob 61 and which is mounted on a mechanical linkage 62 which is coupled to switches S1 through S7. Switch S1 is connected between differential amplifier 51 and a servoamplifier 52 which applies an input to a servomotor 53 and has an output shaft 54 that connects to the shaft 16 to position the way point distance pot 13 and the indicator 17.

The differential amplifier 51 receives an input on lead 48 from the way point distance potentiometer 13 and an input on lead 49 from the DME 10. Switch S3 is connected in the lead 26 and is movable to engage a contact connected to the lead 23 to supply an input to the way point bearing resolver 18 when in the automatic way point mode, Switch S4 is in lead 27 and is movable to engage lead 24 to supply an input to the way point bearing resolver 18 when in the automatic way point mode. Switch S5 is connected in the input of the OBI resolver 12 and is movable to connect the OBI resolver to either the DME 10 or to a reference voltage source 60. Switch S6 is connected in lead 32 and disconnects the output of the summing amplifier 39 from the track resolver 33. Switch S7 is connected in the output lead 31 of the summing amplifier 38 and is connected to the input of the track resolver 33.

In normal operation of the area navigation system switches S1 through S8 are in the positions shown in FIG. 1. In automatic way point mode of operation the knob 61 is tuned to the "on" position and the shafts 62 move switches S1 through S7 to their second positions. For example, S1 supplies the output from the differential amplifier 51 to the amplifier 52, S2